Oct. 29, 1963     W. SANDLER     3,108,487
ADJUSTMENT AND CONTROL MEANS
Filed Feb. 1, 1960     3 Sheets-Sheet 1
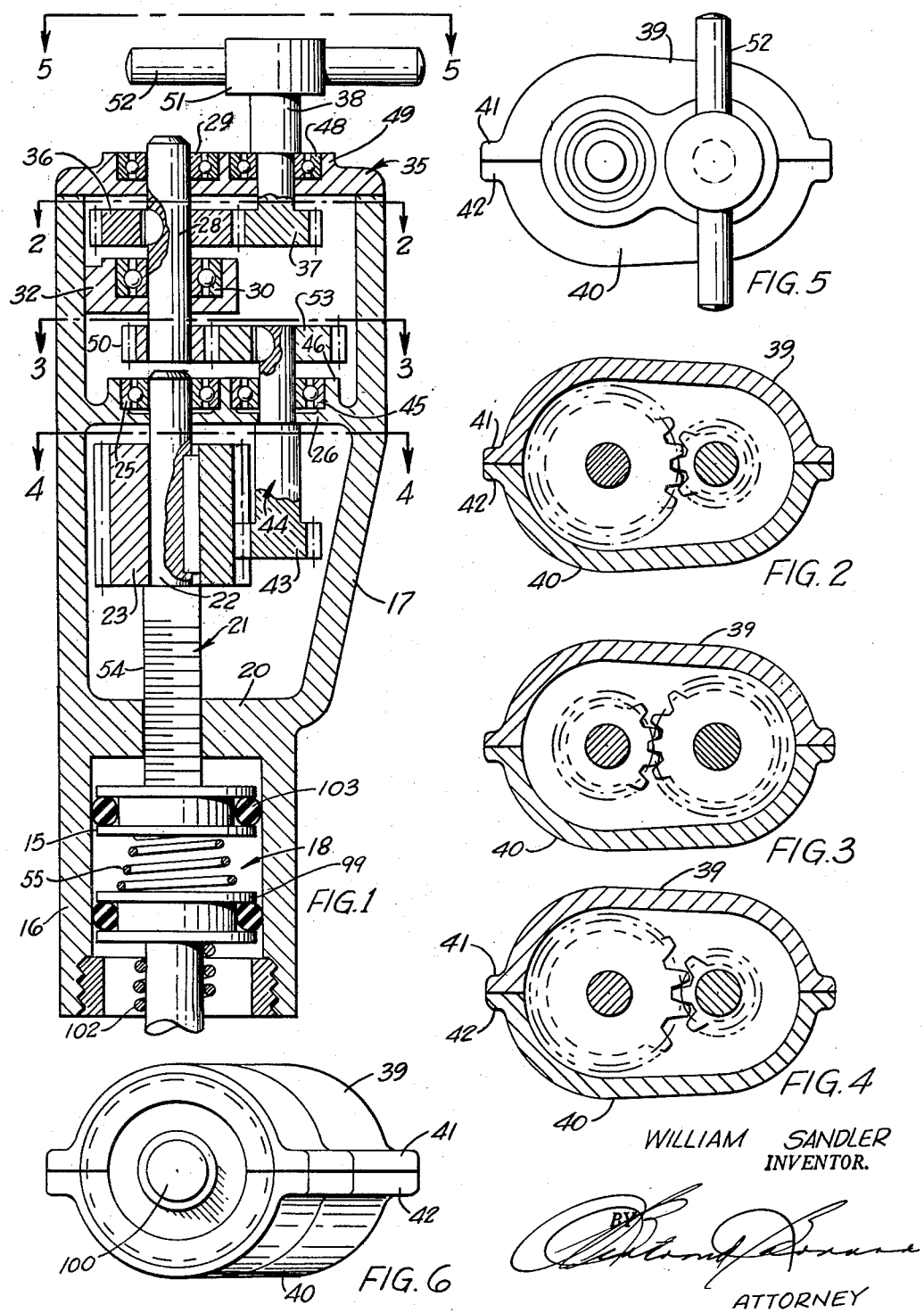
WILLIAM SANDLER
INVENTOR.
ATTORNEY Oct. 29, 1963 W. SANDLER 3,108,487
ADJUSTMENT AND CONTROL MEANS
Filed Feb. 1, 1960 3 Sheets-Sheet 2

WILLIAM SANDLER
INVENTOR.

ATTORNEY

Oct. 29, 1963   W. SANDLER   3,108,487
ADJUSTMENT AND CONTROL MEANS
Filed Feb. 1, 1960   3 Sheets-Sheet 3
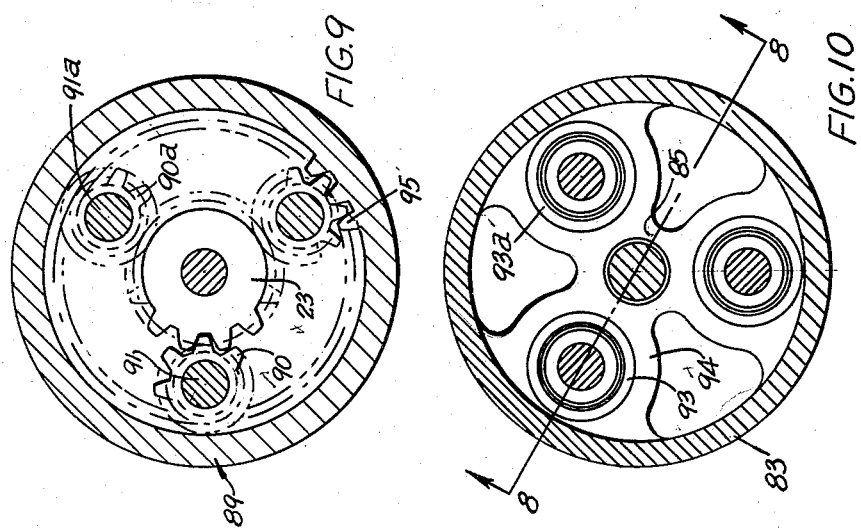
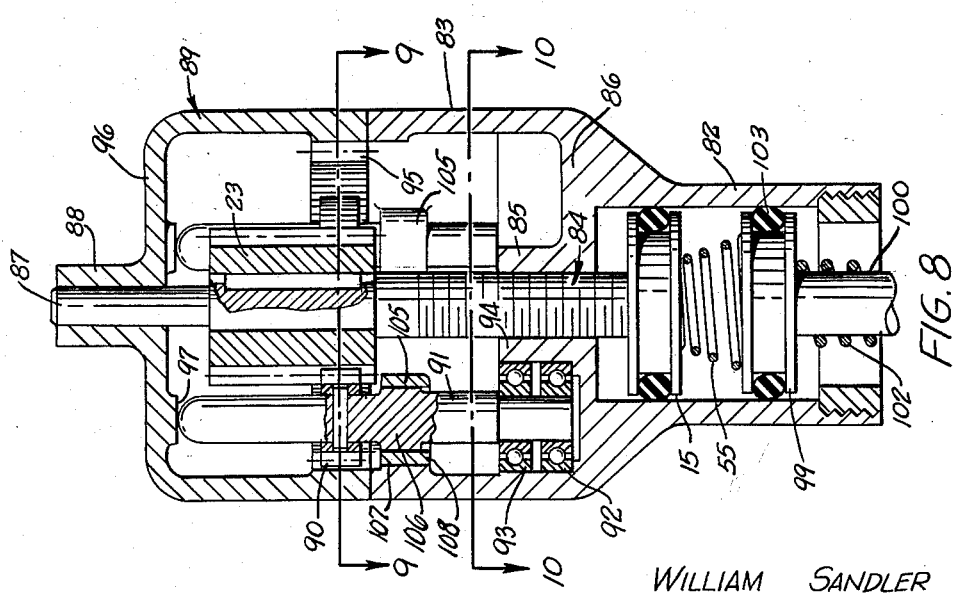
WILLIAM SANDLER
INVENTOR.
ATTORNEYS United States Patent Office 3,108,487
Patented Oct. 29, 1963

3,108,487
ADJUSTMENT AND CONTROL MEANS
William Sandler, 63—33 98th Ave., Forest Hills, N.Y.
Filed Feb. 1, 1960, Ser. No. 5,794
11 Claims. (Cl. 74—424.8)

This invention relates to pressure reducing and regulating a piston and spring combination representing part of a valve for high pressure gases and is particularly directed to a means for obtaining a fine and sensitive adjustment of such piston and spring combination in order to accurately control and regulate the pressure and consequently the volume of flow of gases from high pressure gas containers.

Applicant's device is directed to controlling a piston and spring combination such as that used in conjunction with a gas-regulator or valve shown in U.S. Patent No. 2,855,950 issued to R. R. Phillips on the 14th day of October, 1958, on "Pressure Reducing and Regulating Valves for Use in Association With Containers for Gases Under High Pressure."

In using oxygen and other gases in hospitals and industrial installations, in which such gases are used, the gases are usually supplied and stored in high pressure tanks or containers, in which the gases are maintained at relatively high pressures in order to store a relatively large volume of the gas, when reduced to normal operating pressures, in a comparatively small container.

As gases, such as oxygen, are frequently fed to human beings, who are ill and therefore extremely sensitive, it is essential that the pressure of the gas, when introduced into the chamber in which it is used by a person, such as an oxygen tent, be accurately maintained at a pressure which is prescribed for the purpose.

This is also true of industrial applications, in which gases under pressure, such as oxygen and nitrogen are used, the pressure at which the gas is to be supplied and the volume of gas required during a particular time interval being important.

The primary feature of the invention is that it provides an accurate and extremely sensitive adjustment of the piston and spring combination thereby assisting in regulating the pressure and therefore the volume of a high pressure gas flowing through a gas regulating valve, by adjusting the position of a pair of spring loaded pistons which control the operation of the valve.

Another feature of the apparatus is that the pressure adjustments can be made over a relatively wide range, utilizing the same adjustment means, the sensitivity and accuracy of the adjustment being maintained over the entire range.

Another feature of the device is that the adjustment mechanism is relatively small and compact, so that when fitted to the piston and spring combination of the valve structure, the increase in the overall dimensions of the piston and spring combination are within a reasonable range, so that the combination can be used on the conventional container, without excessive interference.

Another feature of the device is that the ratio between the rate of rotation of the control means and the rate of longitudinal adjustment of the piston and spring combination which manipulates the control member can be varied over a relatively wide range, by making changes in the ratios of the gear trains utilized, the overall dimensions of the unit remaining substantially the same.

Another feature of the construction is that the entire apparatus is rugged for its size, and will withstand relatively severe usage over a sustained period, without damage.

A primary object of the invention is, therefore, to provide an accurate and extremely sensitive adjustment means, as an attachment for the piston and spring combination of a high pressure gas valve, to provide adjustment and variation of the pressure and therefore the volume of a high pressure gas, delivered through a valve, the attachment being suitable for use with a wide range of sizes and types of valves.

Another feature of the mechanism is that the entire operating mechanism is separated from the piston and spring combination which regulates parts of the valve, which are exposed directly to the gases, so that the parts are protected from corrosion and exposure to high temperatures.

In the event that portions of the adjustment mechanism are actually exposed to corrosive atmospheres and materials, when in use, the various parts of the apparatus can be made of corrosion resistant materials, thus protecting them from corrosion.

The accompanying drawings, illustrative of several embodiments of my invention, and various modifications thereof, together with the description of their construction and the method of operation, control, adjustment and utilization thereof, will serve to clarify further objects and advantages of the invention.

In the drawings:

FIG. 1 represents a vertical section through one embodiment of the control and adjustment mechanism, fitted to the uper end of one type of gas pressure reducing and regulating valve, showing the piston and spring combination, and one type of reduction gear train, used for reducing the rate of rotation of the lead screw or piston and spring combination control member.

FIG. 2 is a cross-section through the housing, and a top plan view of one pair of gears, shown in FIG. 1, taken on the line 2—2, FIG. 1.

FIG. 3 is a cross-section, similar to FIG. 2, through another portion of the housing and one of the shafts, shown in FIG. 1, and a plan view of another pair of gears, shown in FIG. 1, taken on the line 3—3, FIG. 1.

FIG. 4 is a cross-section through another portion of the case and the shafts, shown in FIG. 1, and a plan view of the long sliding lead screw control gear, and the drive gear therefor, as shown in FIG. 1, taken on the line 4—4, FIG. 1.

FIG. 5 is a top plan view of the apparatus, shown in FIG. 1, and the control mechanism therefor, taken on the line 5—5, FIG. 1.

FIG. 6 is a bottom plan view of a portion of the piston and spring combination and the operating mechanism therefor, as shown in FIG. 1.

Figure 7:
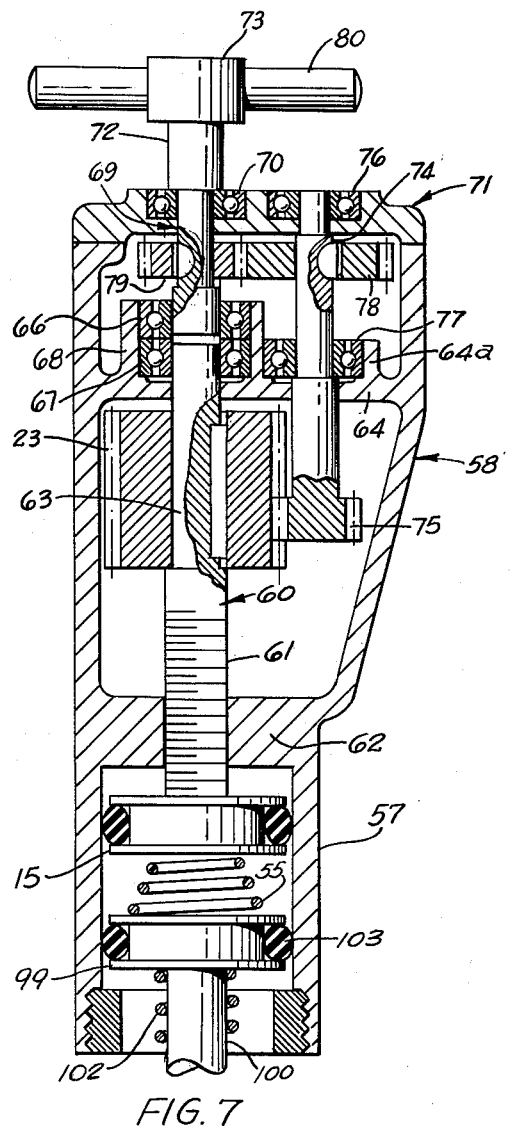

FIG. 7 is a vertical section, similar to FIG. 1, through a modification of the gear train of the piston and spring combination control and adjustment mechanism, shown in FIG. 1, fitted to the upper end of the piston and spring combination which co-acts in regulating a gas pressure reducing and regulating valve, similar to that shown in FIG. 1, showing a modification of the control mechanism, shown in FIG. 1.

FIG. 8 is a vertical section, similar to FIG. 1, through another modification of the piston and spring combination control and adjustment mechanism, shown in FIG. 1, with the control shaft and handle centered relative to the piston and spring combination housing, which is fitted to the upper end of a gas pressure reducing and regulating valve, similar to that shown in FIG. 1, showing a planetary gear for driving the lead screw, which controls the movement of the upper piston of the piston and spring combination, shown in FIG. 1, the section being taken on the line 8—8, FIG. 10.

FIG. 9 is a cross-section through the housing, the planetary gears, and the central sliding gear, shown in FIG. 8, taken on the line 9—9, FIG. 8.

FIG. 10 is a cross-section similar to FIG. 9, through the housing and the planetary pinion shafts shown in FIG. 8, and a plan view of the ball bearings supporting the planetary pinion shafts, the section being taken on the line 10—10, FIG. 8.

It will be understood that the following description of the construction and the method of operation of the "Adjustment and Control Means," is intended as explanatory of the invention and not restrictive thereof.

In the drawings, the same reference numerals designate the same parts, throughout the various views, except where otherwise indicated.

One embodiment of the construction shown in FIGS. 1, 2, and 3, which is used to regulate the vertical movement of the upper piston 15 of the piston and spring combination of a gas regulating and adjustment valve 18, which is supported in a tubular housing section 16, of substantially circular cross-section, is mounted in a cast housing 17, which is integral with, or fixedly attached to the valve housing section 16, a separator wall 20, integral with the piston and spring combination housing section 16, and the control mechanism housing 17 being located between the housing proper and the piston and spring combination section 16 thereof. The detailed construction of the gas regulating valve of which the piston and spring combination in conjunction with which applicant's apparatus is used, forms a part of the control mechanism of a gas regulator or valve as shown in U.S. Patent No. 2,855,950, which was hereinbefore referred to in greater detail.

A substantially cylindrical lead screw 21, which is coaxially aligned with the piston of the piston and spring combination and is externally threaded and threadably fitted to a central opening through the separator wall 20 between the housing 17 and the piston and spring combination housing section 16, is mounted within the housing.

The lead screw 21, the reduced diameter upper section 22 of which has a long drive gear 23 fitted thereto, and pinned or otherwise attached thereto, extends through substantially the height of the lower portion of the housing 17, between the lower separator wall 20, and an upper separator wall, which is located above the long drive gear 23, the upper end of the cylindrical reduced diameter section of the lead screw shaft, being supported by an anti-friction bearing 25, which is supported by a boss integral with the upper separator wall 26, which is located between the open upper end of the housing 17, and the lower portion thereof in which the lead screw drive gear 23 is fitted.

A substantially cylindrical upper shaft 28, which is co-axial with the cylindrical upper end of the lead screw shaft 22, is located above the lead screw 21. The upper shaft 28 is separated from the upper section 22 of the lead screw 21, shown in FIG. 1, by a relatively narrow gap located below the bottom of the pinion 50. A chamfer is formed at the end of the upper section 22 of the lead screw, the chamfer extending from the upper end of the bearing 25, to the upper end of the shaft section 22.

When the gear 23 is moved downward by rotation of the lead screw 21, by meshing the rotary pinion 43, with the gear 23, the lead screw 21 is moved downward.

The lead screw may be moved downward through a distance equal to or greater than the depth of the inner race of the anti-friction bearing 25, and the depth of the separator wall 26.

The chamfer at the upper end of the upper section 22, of the lead screw, enables the upper section 22 of the lead screw to be moved upward through the opening in the separator wall 26, and into the inner race of the bearing 25.

This provides adequate movement of the lead screw to enable the piston 15 to be moved downward against the pressure of the spring 55, to control the operation of the valve in a manner hereinafter described.

The upper shaft is supported by a pair of anti-friction bearings 29, 30, including a lower bearing 30 which is supported by bracket 32, attached to the inner wall of the open upper section of the housing 17 with the upper anti-friction bearing 29 supported by a boss formed in a cover 35, which is attached to the open upper end of the housing by a plurality of screws, bolts, or other suitable attaching means.

The upper shaft 28 is driven by a gear 36, which is fitted to the upper end thereof, below the anti-friction bearing and fixedly attached to the upper shaft 28, a drive pinion 37, which is attached to or integral with the lower end of a drive shaft 38, located substantially parallel to the upper portion of the upper shaft 28, which is in turn co-axial with and located above the reduced diameter shaft end of the lead screw 21 being provided to drive the gear 36, and the upper shaft 28 to which it is attached.

As shown in FIGS. 2, 3, 4, and 6, the upper housing 17 and the lower piston and spring combination housing section 16 thereof can be made in two sections or halves 39, 40 to facilitate assembly, a pair of flanges 41, 42, being formed integral with each of the housing sections, as shown in FIGS. 2–5, the two housing sections being fastened to one another by bolts, screws, or other suitable attaching means, dowels being inserted between the two halves 39, 40, to assure positive alignment between the two housing sections, if they are separated for any reason.

The long sliding drive gear 23 attached to the lead screw is driven by a secondary drive pinion 43, which is integral with, or attached to the lower end of secondary shaft 44, which is substantially parallel to the lead screw 21, and supported by one or more anti-friction bearings 45, one bearing of which is fitted to a boss 46 integral with the upper separator wall 26 of the housing 17, the bearing 45 being located adjacent, and substantially parallel to the bearing 25, which supports the upper end of the lead screw 21.

The drive shaft 38 which drives the upper drive pinion 37, is supported by an anti-friction bearing 48, which is mounted in a boss 49, integral with the cover 35, attached to the open upper end of the housing 17.

As shown in FIG. 1, a substantially cylindrical hub 51, is formed integral with the upper end of the drive shaft 38, a substantially cylindrical handle pin 52 slidably fitted through an opening through the hub 51 being provided, to facilitate rotation of the drive shaft 38 and the pinion 37 attached thereto, or integral therewith.

The operation of the apparatus shown in FIGS. 1–5 is substantially as follows:

When the drive shaft 38 is rotated by means of the pin handle 52, the pinion 37 attached to the drive shaft, rotates the drive gear 36 attached to the upper shaft 28, through an angular range considerably less than that of the angle through which the drive shaft 38 is rotated.

The pinion 50 attached to the lower end of the upper shaft, in turn, rotates the drive gear 53 of the secondary drive shaft 44, with which it meshes, the speed of rotation of the secondary drive shaft being less than that of the upper drive shaft 38, due to the fact that the gear 53 attached to the secondary drive shaft is larger than the pinion 50.

As the pinion 43 attached to the secondary drive shaft is rotated, it meshes with the long lead screw drive gear 23, thereby causing the lead screw 21 to be rotated through an angular range considerably smaller than that through which the intermediate shaft is rotated. The external threads 54 on the outer circumference of the lead screw, which are fitted to the internal threads in the lower separator wall 20 cause the lead screw to be moved longitudinally toward the upper piston 15 of the piston and spring combination, when the lead screw is rotated in one direction, against the pressure of the frusto-conical coiled spring 55 located below the upper piston 15.

As the speed of rotation of the lead screw or the angular increment through which it is rotated is considerably less than the angle through which the drive shaft is rotated the longitudinal movement of the lead screw 21 and therefore the upper piston 15 is relatively small, as compared to the angle through which the drive shaft 38 is rotated. This provides an extremely fine adjustment or regulation of the piston and spring combination 18, and therefore much more accurate regulation and gas pressure control of the valve than is possible by ordinary operating means.

When the rotation of the drive shaft 38 and the control handle 52 attached thereto, is reversed from that hereinbefore described, the lead screw 21 is elevated from the position, shown in FIG. 1, by reversing the direction of rotation of the threaded portion of the lead screw.

This causes the lead screw 21, to be elevated, the lower end of the lead screw releasing the pressure against the upper piston 15 of the piston and spring combination.

This releases the pressure in the upper frusto-conical spring 55 and allows the spring 55 to elevate the upper piston, thereby adjusting the piston and spring combination 18, in a manner hereinafter described.

In a modification of the construction, shown in FIG. 7, the piston and spring combination construction is substantially the same as that shown in FIG. 1.

The tubular housing section 57 of the piston and spring combination is substantially the same as that shown in FIG. 1, the upper piston 15 and the frusto-conical upper valve spring 55, used in conjunction therewith, being substantially the same.

The control mechanism housing 58, which is integral with the piston and spring combination housing 57, is similar to that shown in FIGS. 1–5, the housing being formed in two sections, which are divided along a vertical plane through the center of the housing in substantially the same manner as the housing shown in FIGS. 2–5.

The substantially cylindrical lead screw 60, shown in FIG. 7, is similar to that shown in FIG. 1, the externally threaded section 61 of the lead screw being threadably fitted to a central opening through the lower separator wall 62, which is located between the upper housing 58 and the valve housing section 57.

The lead screw 60 is located co-axially with the upper piston 15 of the piston and spring combination in the same manner as that shown in FIG. 1.

The reduced diameter upper section 63 of the lead screw, which is similar to that shown in FIG. 1, extends through an opening in an upper separator wall 64, which is similar to that shown in FIG. 1, the upper end of the lead screw being supported by the lower ball bearing 67 of a pair of ball bearings 66, 67, which is fitted to a boss 68, integral with the upper separator wall 64.

The lead screw has a long drive gear 23, fitted thereto, and fixedly attached thereto, in the same manner as that shown in FIG. 1.

A substantially cylindrical stepped upper shaft 69 which is similar to that shown in FIG. 1, is located above the lead screw 60 substantially co-axially therewith.

The upper shaft is supported by a pair of anti-friction bearings 70, 66, the upper bearing 70, which is supported by a boss formed in a cover 71 attached to the open upper end of the housing, supporting the reduced diameter upper end of the upper shaft.

A tubular collar 72, located between a cylindrical hub 73, attached to the upper end of the reduced diameter section of the upper shaft and the upper housing 58 supporting the upper end of the upper shaft is fitted to the reduced diameter section of the upper shaft, to locate the cylindrical hub 73, relative to the upper bearing 70.

The long drive gear 23 fitted to the lead screw 60 is driven by a pinion 75, which is integral with, or attached to the lower end of a driven shaft 74 which is substantially parallel to the upper shaft 69.

The driven shaft 74 is supported by a pair of spaced anti-friction bearings 76, 77, the upper bearing 76 of which is fitted to a boss integral with the cover 71 which is attached to the open upper end of the housing 58. The lower bearing 77, which is co-axially aligned with the upper bearing 76 is fitted to a boss 64a integral with the separator wall 64, the lower bearing being substantially parallel to and located adjacent the bearing 67 supporting the upper end of the lead screw 60.

A driven gear 78, is located in axial alignment with, and meshes with the pinion 79 fitted to the upper portion of the upper or drive shaft, between the bearings 76, and 77, the driven gear 78 being of larger diameter than the pinion 79 fitted to the upper or drive shaft, thus stepping down the speed of rotation of the driven shaft, relative to that of the upper or drive shaft 69.

The drive pinion 79 and the gear 78 meshing with it may be spur gears, or helical gears, or the drive pinion 79 may be made in the form of a worm, the driven gear 78 being a worm gear or worm wheel, the type of gear and pinion employed depending upon the reduction required between the upper or drive shaft 69 and the driven shaft 74 which is parallel thereto.

A long cylindrical pin 80 slidably fitted through an opining through the hub 72 attached to the drive shaft 69, is provided to facilitate manual rotation of the drive shaft in substantially the same manner as the drive shaft shown in FIG. 1.

The external threads 61 on the outer circumference of the lead screw 60, which are fitted to the internal threads through the opening in the lower separator wall 62 cause the lead screw to be moved longitudinally relative to the upper piston 15 of the piston and spring combination, when the lead screw 60 is rotated, in substantially the same manner as that shown in FIG. 1.

The operation of the modified apparatus shown in FIG. 7, which is similar to that shown in FIG. 1, is substantially as follows:

When the drive shaft 69 is manually rotated by means of the pin handle 80, the pinion 79, or worm attached to the drive shaft, rotates the driven gear 78, which is attached to the driven shaft 74, through an angular range considerably less than that of the angle through which the drive shaft 69 is rotated.

As the drive shaft 69 is rotated, the pinion 75 attached to the lower end of the driven shaft 74, which meshes with the long drive gear 23 attached to the lead screw 60, is rotated, thereby causing the lead screw 60 to be rotated through an angular range considerably smaller than that through which the driven shaft is rotated.

The external threads 61 on the outer circumference of the lead screw 60, which are fitted to the internal threads through the lower separator wall 62, cause the lead screw to be moved longitudinally toward or away from the upper piston of the piston and spring combination, depending upon the direction of rotation of the lead screw 60 in substantially the same manner as that shown in FIG. 1, the upper piston 15 being moved downward against the pressure of the frusto-conical spring 55, located below the upper piston 15 when the lead screw is rotated in one direction.

Due to the double gear reduction between the drive shaft 69 mounted co-axially with the lead screw 60 and the lead screw 60, the degree of rotation of the lead screw is stepped down markedly from the degree of rotation of the drive shaft 69.

This causes a relatively fine adjustment of the upper piston 15 mounted adjacent the lower end of the lead screw 60, even though the drive shaft 69 may be rotated through a relatively large angle.

When the rotation of the drive shaft 69 and the control handle 80 fitted thereto, is reversed, relative to that hereinbefore described, the lead screw 60 is elevated from the position shown in FIG. 7, by reversing the direction of rotation of the threads of the lead screw, in substantially the same manner, as that shown in FIG. 1.

This causes the lead screw 60 to be elevated, the lower end of the lead screw releasing the pressure against the upper piston 15 of the piston and spring combination.

This allows the frusto-conical upper spring of the piston and spring combination to move the upper piston upward in substantially the same manner as that shown in FIG. 1, and hereinbefore described.

In another modification of the construction, shown in FIGS. 8, 9, and 10, a planetary gear reduction mechanism, is substituted in place of the reduction gear drive shown in FIG. 1.

The housing section 82, of the piston and spring combination, the upper piston 15 thereof, and the frusto-conical upper spring 55 controlling the movement of the upper piston 15, are substantially the same as those shown in FIG. 1.

The control mechanism housing section 83, which is of substantially circular cross-section is integral with, and located above the smaller circular piston and spring combination housing section, as shown in FIGS. 8, 9, and 10.

The lead screw 84, which is of stepped cylindrical form is similar to that shown in FIG. 1, except that it is centrally located, co-axially with the housing 83. The lower portion of the lead screw 84 is externally threaded, the threads being fitted through a central opening through the hub 85, at the center of a separator wall 86, which is integral with the two housing sections and located between the upper housing section and the piston and spring combination housing section 82.

The cylindrical reduced diameter upper end 87, of the lead screw 84 is rotatably fitted to a cylindrical opening through the central hub 88, which is integral with the circular top wall of a cupped substantially circular cap 89, which is located above the top of the open end of the upper housing section 83.

A long drive gear 23, which is fitted to the intermediate section of the lead screw is attached thereto by a pin or other suitable attaching means.

The lead screw drive gear 23 meshes with and is driven by a plurality of radially positioned, equally spaced radially positioned pinions 90, 90a, each of which is supported by a long substantially cylindrical pinion shaft 91, 91a, which extends from the upper end of the separator wall 86 to the inner surface of the top wall of the cap 89, as shown in FIG. 8.

Each of the pinion shafts 91, 91a is supported by a pair of anti-friction bearings 92, 93, each pair of bearings being supported by a radially positioned boss 94, which is integral with the upper end of the separator wall 86, located between the housing sections 82, 83.

The radially positioned pinions 90, 90a are driven by an internal ring gear 95, which is concentric with the circumferential outer wall of the cap 89, and located at substantially the lower open end of the cap 89.

The upper portion of each of the pinion shafts 91, 91a is supported by a tubular bushing 105, 105a, made of bronze, or other bearing material, as shown in FIG. 8, an enlarged cylindrical section 106 of each of the pinion shafts 91, 91a, being fitted to the interior of the corresponding bushing 105, 105a, which is axially aligned with the pinion shaft.

An annular mounting face 107 is formed integral with the inner surface of the control mechanism housing 83, adjacent the bushings 105, 105a. Each of the bushings 105, 105a, has an annular flange 108 machined thereon, the annular flange engaging the inner surface of the mounting face 107 of the housing, adjacent the outer circumference of the bushing, each of the flanges 108 being attached to the annular mounting face of the housing by a plurality of screws (not shown) or other suitable attaching means inserted through each flange 108.

The bushings 105, 105a, which are co-axial with the anti-friction bearings 92, 93 support the upper portion of each of the pinion shafts 91, 91a and the radially positioned pinions 90, 90a integral therewith.

In order to support the upper wall 96 of the cap in its proper position, a flat annular ring 97 is formed on the inner surface of the top 96 of the cap, the annular ring 97 being supported by the hemi-spherical or arcuate upper ends of the pinion shafts 91, 91a.

In order to facilitate rotation of the cap 89 the circumferential outer wall of the cap 89 may be knurled, serrated, or otherwise roughened.

The diameter of the long drive gear of the lead screw is considerably greater than that of radially positioned pinions, thus reducing the rate of rotation or the rotational angular movement of the drive gear 23 below that of the radially positioned pinions 90, 90a, in that manner, the rotational angular movement of the lead screw 84 is considerably less than that of the cap 89.

The external threads on the outer circumference of the lead screw 84, which are fitted to the internal threads through the central hub 85 integral with the separator wall between the two housing sections, cause the lead screw to be moved longitudinally toward or away from the upper piston 15 of the piston and spring combination in a manner similar to that shown in FIG. 1, and hereinbefore described. The upper piston 15 is moved downward, against the pressure of the frusto-conical upper compression spring 55 when the cap 89 is rotated in one direction, thereby causing the lead screw, and the long drive gear 23 attached thereto to be rotated in a direction opposite that of the rotation of the cap 89.

The upper piston 15 of the piston and spring combination is moved downward against the pressure of the frusto-conical upper spring 55, when the lead screw is rotated in one direction, by rotating the cap 89 in a direction opposite that of the lead screw 84.

When the rotation of the cap 89 is reversed, thereby reversing the direction of rotation of the lead screw, the lead screw is moved away from the top of the upper piston 15, thereby allowing the frusto-conical upper compression spring 55 to move the upper piston 15 upward toward the tip of the lead screw 84.

The operation of the apparatus, shown in FIGS. 8, 9, 10, which is similar to that shown in FIGS. 1–6, is substantially, as follows:

When the internal ring gear equipped cap is manually rotated, by gripping the knurled external surface thereof, the internal ring teeth 95 in the cap, rotate the radially positioned pinions 90, 90a, shown in FIGS. 8 and 9.

The radially positioned pinions 90, 90a, which are meshed with the long sliding drive gear 23 attached to the lead screw, rotate the lead screw 84 through an angle considerably less that of the angular movement of the individual radially positioned pinions 90, 90a.

The external threads on the outer circumference of the lead screw 84, which are threadably fitted to the internal threads through the hub 85, which is integral with the separator wall 86, convert the rotational movement of the lead screw 84 to axial movement thereof.

This causes the lead screw to move downward, FIG. 8, thereby forcing the upper piston 15 of the piston and spring combination downward against the pressure of the frusto-conical spring 55, which is located below the upper piston 15.

This controls the operation of the piston and spring combination, by moving the upper piston downward toward the lower piston 99 of the valve, against the pressure of the frusto-conical upper spring 55.

The movement of the upper piston toward the lower piston 99, which is attached to or integral with a central piston rod 100, causes the lower piston 99 and the piston rod 100 to be moved downward out of the housing supporting the piston and spring combination, and into the valve housing, against the pressure of a lower coiled compression spring 102, which is mounted below the lower piston 99, the piston rod controlling the operating pressure and the cyclical pressure of the gas, and therefore the volume of the gas flowing from the container.

When the direction of rotation of the cap 89 is reversed, the rotation of the lead screw 84 is also reversed, thereby causing the lower end of the lead screw to move away from the upper piston 15. This allows the upper piston 15 to move upward toward the lower end of the lead screw 84, under pressure of the frusto-conical spring 55, thereby reducing the pressure of the upper spring 55 and momentarily increasing the gas pressure in the chamber surrounding the frusto-conical spring 55.

When the combined pressure of the frusto-conical spring 55 and that of the gas in the chamber surrounding the upper spring, is built up to a point where they overcome the combined pressure of the lower spring 102 and that of the gas against the valve, they cause an inward or downward movement of the lower piston 99.

When the lead screw is moved downward by the rotation of the cap, the upper piston is moved downward, thereby compressing the frusto-conical spring 55, and reducing the critical gas pressure in the chamber surrounding the frusto-conical spring 55 with a corresponding effect on the lower piston 99, and the lower spring 102, acting against it.

By reducing the rate of rotation of the lead screw and consequently the axial movement thereof, toward and away from the upper piston, due to the gear reduction provided, the movement of the upper piston is controlled with a high degree of accuracy. This provides an extremely accurate control of the gas pressure in the chamber surrounding the frusto-conical spring 55, and therefore the pressure differential between the combined pressure of the gas in the chamber, surrounding the frusto-conical spring and the frusto-conical spring pressure, and the combined pressure of the lower spring 102 and that of the gas against the valve, thus providing an extremely accurate control of the timing of the piston and spring combination which adjusts the opening and closing of the valve and therefore the supply of gas from the gas container.

The groove surrounding the outer circumference of each of the pistons 15 and 99 has a compressible O-ring 103, or other type of seal ring fitted thereto, thus providing a positive seal between the pistons 15, 99 and the inner surface of the cylinder 82, and in that manner sealing the individual chambers adjacent the pistons 15 and 99.

The operation of the piston and spring combination used in conjunction with the lead screw construction, shown in FIG. 1–6, and that shown in FIG. 7, is substantially the same as that shown in FIGS. 8–10, and hereinbefore described.

In both instances, the axial movement of the lead screw is controlled in the manner shown in the drawings and hereinbefore described, thus controlling the relative positions of the pistons of the piston and spring combination and therefore the pressure of the gas within the valve and the volume of gas fed from the container in the manner hereinbefore described.

Where extremely accurate adjustment of the lead screw 84 and the movement of the upper piston 15 of the piston and spring combination is required, the mechanism shown in FIGS. 1–6 would be utilized.

In installations which are not quite as sensitive or critical, the reduction gear mechanism shown in FIG. 7 can be utilized, the operation of the piston and spring combination remaining substantially the same, although the sensitivity of control would be reduced somewhat.

The upper pinion 79, shown in FIG. 7, and the gear 78 meshing with it may be spur gears, or a pinion and gear combination fitted with helical gear teeth may be substituted therefor.

Where a greater reduction is required between the drive pinion shown in FIG. 7, and the gear used in conjunction therewith, the drive pinion 79 may be replaced by a worm, and a worm wheel substituted for the drive gear 78.

Where a greater reduction is required between the rotation of the control handle shown in FIG. 7, and that of the lead screw 60, an additional pair of gears may be introduced between the upper pair 79, 78, shown in FIG. 7, and the drive pinion 75, which controls the long sliding gear 23.

The construction shown in FIGS. 1–6 is utilized in installations in which a high degree of sensitivity is required between the rotation of the control handle 80 and the rate of rotation, or axial movement of the lead screw 60.

The final reduction between the rate of rotation of the control handle and that of the lead screw 60 would be a function of the combination of the combined reduction between the drive gears 36, 37, the intermediate gears 50, 53, and the final drive gears 43, 23, all of which may be varied to attain the final reduction required at the lead screw 21.

Similarly, the pitch of the threads of the lead screw may be varied, to increase or decrease the axial movement of the lead screw, for each rotation of the lead screw.

Where a still finer adjustment than that shown in FIGS. 1–6, is required, an additional pinion and gear combination can be introduced between the driving pair 36, 37 and the intermediate pair 50, 53, thereby further increasing the reduction between the rate of rotation of the drive shaft, or control handle 52 and that of the lead screw 21, which, combined with the pitch of the threads in the lead screw, controls the axial movement of the lead screw 21 and therefore the movement of the upper piston 15 of the valve relative to the frusto-conical upper spring 55.

It will be apparent to those skilled in the art that the present invention is not limited to the specific details described above and shown in the drawings, and that various modifications are possible in carrying out the features of the invention and the operation, actuation, and method of control, mounting and utilization thereof, without departing from the spirit and scope of the appended claims.

What I claim is:

1. An apparatus for adjusting and regulating a piston and spring combination, including a substantially tubular piston housing with a pair of co-axial pistons, slidably fitted to said tubular piston housing, and a compression spring separating said pistons, said adjusting apparatus comprising a housing co-axially aligned with the piston housing and fixedly attached thereto, a separator wall integral with the adjusting apparatus housing located between the adjusting housing and the piston housing, a substantially cylindrical lead screw co-axial with the piston housing threadably fitted to the separator wall, one end of said lead screw being in engagement with one of the pistons, said lead screw being operative to control the spacing between said pistons, to control the pressure of the spring inserted between the pistons, thereby to regulate the gas valve, a substantially cylindrical shaft integral with and co-axial with the lead screw and extending therebeyond, an elongated gear fixedly attached to the cylindrical shaft co-axially with the lead screw, for axial movement therewith, a pinion mounted substantially parallel to the elongated gear, meshing with said elongated gear, gear reduction means supported by said adjusting apparatus housing, adapted to control the rotation of the pinion meshing with the elongated gear, and means adapted to rotate said reduction gear means.

2. An apparatus for adjusting a piston and spring combination including a substantially tubular piston housing with a pair of co-axial pistons slidably fitted to said piston housing, and a compression spring separating said pistons, said piston adjusting apparatus comprising a housing co-axially aligned with the piston housing and fixedly attached thereto, a separator wall integral with the adjusting apparatus housing located between the adjusting apparatus housing and the housing of the piston and spring combination, a substantially cylindrical lead screw co-axial with the piston housing threadably fitted to the separator wall, said lead screw being adapted to engage one of the pistons to longitudinally move the piston relative to the other piston, a substantially cylindrical shaft integral with the lead screw and extending therebeyond, an elongated gear fixedly attached to the cylindrical shaft, co-axially with the lead screw, for axial movement therewith, a pinion mounted substantially parallel to the elongated gear and meshing therewith, a secondary shaft integral with the pinion meshing with the elongated gear and concentric with the pinion, gear reduction means supported by said adjusting apparatus housing adapted to control speed of rotation of the pinion meshing with the elongated gear, and means adapted to rotate said reduction gear means.

3. An apparatus for adjusting a piston and spring combination, as in claim 2, in which the gear reduction means includes an auxiliary shaft mounted co-axially with the lead screw, means fitted to said adjusting apparatus housing rotatably supporting the auxiliary shaft, a drive pinion mounted on said auxiliary shaft, co-axially therewith, a secondary drive gear mounted on the secondary drive shaft, co-axially therewith, meshing with the drive pinion mounted on the auxiliary shaft, the rotation means being adapted to rotate the drive pinion mounted on the auxiliary shaft, the secondary drive gear being co-axial with and fixedly connected to the pinion meshing with the elongated gear, the secondary drive gear being adapted to control the rotation of the pinion meshing with the elongated gear.

4. An apparatus for adjusting a high pressure gas valve, as in claim 2, in which the gear reduction means includes an auxiliary shaft mounted co-axially with the lead screw, said auxiliary shaft being independent of and axially separated from the lead screw, anti-friction bearing means supported by the adjusting apparatus housing rotatably supporting the auxiliary shaft, a drive pinion mounted on the auxiliary shaft, co-axially therewith, and fixedly attached thereto, the pinion meshing with the elongated gear being co-axial with the secondary shaft, a secondary drive gear mounted on the secondary drive shaft meshing with the drive pinion mounted on the auxiliary shaft, a second gear mounted on the auxiliary shaft spacedly located relative to the drive pinion fixedly attached to the auxiliary shaft, a second drive pinion mounted substantially parallel to the second drive gear, meshing with the second drive gear, a shaft integral with the second drive pinion extending outward beyond the adjusting apparatus housing, the means adapted to rotate the reduction gear means being a rotation member fixedly attached to the outwardly extending shaft integral with the second drive pinion.

5. An apparatus for adjusting a piston and spring combination, including a substantially tubular piston housing with a pair of co-axial pistons slidably fitted to said piston housing, and a compression spring separating said pistons, said piston and spring combination adjusting apparatus comprising a housing located adjacent one end of the valve housing and fixedly attached thereto, a separator wall integral with the adjusting apparatus housing located between the adjusting apparatus housing and the piston housing, a substantially cylindrical lead screw co-axial with the piston housing threadably fitted to the separator wall, said lead screw being adapted to engage one of the pistons to longitudinally move the piston relative to the other piston, a substantially cylindrical extension shaft integral with the lead screw and extending therebeyond, an elongated gear fixedly attached to the cylindrical shaft, co-axially with the lead screw, for axial movement therewith, a drive pinion mounted substantially parallel to the elongated gear and meshing therewith, a substantially cylindrical stepped shaft mounted co-axially with the lead screw, adjacent one end of the extension shaft, gear reducing means driven by the stepped cylindrical shaft adapted to reduce the speed of rotation of the lead screw relative to the cylindrical stepped shaft, and means adapted to rotate the reduction gear means.

6. An apparatus for adjusting a piston and spring combination, as in claim 5, in which the reduction gear means includes a reduction drive pinion mounted on the stepped cylindrical shaft, a drive shaft integral with the drive pinion meshing with the elongated gear, located substantially parallel to the stepped cylindrical shaft, a driven gear, co-axial with the drive pinion, meshing with the elongated gear, mounted on the drive shaft, said driven gear meshing with the reduction drive pinion, and rotation control means fixedly attached to the stepped cylindrical shaft, said rotation control means being adapted to rotate reduction drive pinion.

7. An apparatus for adjusting a piston and spring combination, including a substantially tubular piston housing with a substantially cylindrical piston slidably fitted to the piston housing, a coiled compression spring mounted adjacent one face of the piston, said piston and spring combination adjusting apparatus comprising a housing located adjacent one end of the piston housing and fixedly attached thereto, a separator wall integral with the adjusting apparatus housing located between the adjusting apparatus housing and the piston housing, a substantially cylindrical lead screw co-axial with the adjusting apparatus housing, threadably fitted to the separator wall, said lead screw being adapted to engage one end of the piston to longitudinally move the piston against the pressure of the compression spring, a stepped substantially cylindrical shaft integral with the lead screw and extending therebeyond, an elongated gear fixedly attached to the stepped cylindrical shaft, co-axially with the lead screw, for axial movement therewith, a plurality of radially positioned drive pinions located substantially parallel to the elongated gear and meshing therewith, a drive shaft integral with each of said drive pinions carried by the adjusting apparatus housing, substantially parallel to the lead screw, and means surrounding the radially positioned drive pinions adapted to rotate the drive pinions.

8. In combination with an apparatus for adjusting a piston and spring combination, as in claim 7, a central hub integral with the separator wall of the adjusting apparatus housing, concentric with said housing, said central hub threadably supporting the lead screw, a plurality of anti-friction bearings co-axial with each of said pinion drive shafts, rotatably supporting the planetary drive pinions.

9. In combination with an apparatus for adjusting a piston and spring combination, as in claim 7, a hollow substantially cylindrical cap having one closed end rotatably mounted adjacent one end of the adjusting apparatus housing, said rotatable cylindrical cap having a central boss integral with the closed end thereof, the central boss being adapted to rotatably support one end of the stepped cylindrical shaft, the end of said rotatable cylindrical cap, opposite the closed end thereof having internal gear teeth therein, the internal gear teeth being the means adapted to mesh with the drive pinions and rotate the drive pinions.

10. An apparatus for adjusting and regulating a piston and spring combination, including a substantially tubular piston housing with a substantially cylindrical piston slidably fitted to the piston housing, a coiled compression spring mounted adjacent one face of the piston, said piston and spring combination adjusting apparatus comprising a housing located adjacent one end of the valve housing and fixedly attached thereto, a separator wall integral with the adjusting apparatus housing located between the adjusting apparatus housing and the piston housing, a substantially cylindrical lead screw co-axial with the piston housing threadably fitted to the separator wall, said lead screw being in engagement with one of the pistons, said lead screw being operative to vary the spacing between said pistons to adjust the pressure of the compression spring located between the pistons, thereby to regulate the gas valve, a substantially cylindrical shaft co-axial and integral with the lead screw and extending therebeyond, an elongated gear fixedly attached to the cylindrical shaft, co-axially with the lead screw, for axial movement therewith, a drive pinion mounted substantially parallel to the elongated gear, and meshing with said elongated gear for driving same, gear reduction means supported by said adjusting apparatus housing, adapted to control the rate of rotation of the drive pinion meshing with the elongated gear, and rotation means adapted to rotate said reduction gear means, one gear element of said reduction gear means being co-axial with and fixedly connected to the pinion meshing with the elongated gear.

11. An apparatus for adjusting a piston and spring combination, as in claim 10, in which the gear reduction means includes an auxiliary shaft mounted co-axially with the lead screw, said auxiliary shaft being independent of, and axially separated from the lead screw, a plurality of anti-friction bearings supported by the adjusting apparatus housing rotatably supporting the auxiliary shaft, a drive pinion mounted on the auxiliary shaft, co-axially therewith, and fixedly attached thereto, a secondary shaft integral with the elongated gear drive pinion co-axial therewith, a secondary drive gear mounted on the secondary drive shaft meshing with the drive pinion mounted on the auxiliary shaft, a second drive gear mounted on the auxiliary shaft, spacedly located relative to the drive pinion fixedly attached to the auxiliary shaft, a second drive pinion mounted substantially parallel to the second drive gear, meshing with the second drive gear, a shaft integral with the second drive pinion extending outward beyond the adjusting apparatus housing, the means adapted to rotate the reduction gear means being a rotation member fixedly attached to the outwardly extending shaft integral with the second drive pinion.

References Cited in the file of this patent

UNITED STATES PATENTS

| | | |
|---|---|---|
| 1,784,094 | Fletcher | Dec. 9, 1930 |
| 1,903,074 | Weymouth | Mar. 28, 1933 |